(12) United States Patent
Allen et al.

(10) Patent No.: US 8,253,748 B1
(45) Date of Patent: Aug. 28, 2012

(54) SHADER PERFORMANCE REGISTERS

(75) Inventors: Roger L. Allen, Lake Oswego, OR (US);
Brett W. Coon, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1318 days.

(21) Appl. No.: 11/290,764

(22) Filed: Nov. 29, 2005

(51) Int. Cl.
*G06F 15/00* (2006.01)
(52) U.S. Cl. .......................................... 345/501; 702/182
(58) Field of Classification Search .................. 345/501; 702/182
See application file for complete search history.

(56) References Cited

U.S. PATENT DOCUMENTS

| | | | |
|---|---|---|---|
| 3,952,304 A | 4/1976 | Broniwitz et al. | |
| 5,428,749 A | 6/1995 | Rouse et al. | |
| 5,537,541 A * | 7/1996 | Wibecan | 714/45 |
| 5,546,037 A | 8/1996 | Kenny et al. | |
| 5,675,729 A * | 10/1997 | Mehring | 714/37 |
| 5,796,637 A * | 8/1998 | Glew et al. | 702/190 |
| 5,805,850 A | 9/1998 | Luick | |
| 5,825,674 A | 10/1998 | Jackson | |
| 5,835,702 A * | 11/1998 | Levine et al. | 714/39 |
| 5,881,223 A * | 3/1999 | Agrawal et al. | 714/47 |
| 6,006,321 A | 12/1999 | Abbott | |
| 6,023,759 A | 2/2000 | Omtzigt | |
| 6,067,643 A | 5/2000 | Omtzigt | |
| 6,112,318 A * | 8/2000 | Jouppi et al. | 714/47 |
| 6,356,615 B1 | 3/2002 | Coon et al. | |
| 6,374,367 B1 * | 4/2002 | Dean et al. | 714/37 |
| 6,775,640 B1 * | 8/2004 | Swanson et al. | 702/182 |
| 2002/0073255 A1 * | 6/2002 | Davidson et al. | 710/104 |
| 2002/0124237 A1 * | 9/2002 | Sprunt et al. | 717/127 |
| 2003/0126487 A1 | 7/2003 | Soerensen et al. | |
| 2004/0006724 A1 * | 1/2004 | Lakshmanamurthy et al. | 714/25 |
| 2005/0122334 A1 * | 6/2005 | Boyd et al. | 345/520 |
| 2005/0188276 A1 * | 8/2005 | Hunter et al. | 714/39 |
| 2006/0152509 A1 | 7/2006 | Heirich | 345/426 |
| 2007/0093986 A1 * | 4/2007 | Armstead et al. | 702/182 |

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

Office Action, U.S. Appl. No. 11/313,872, dated Jul. 16, 2009.

* cited by examiner

*Primary Examiner* — Maurice L McDowell, Jr.
(74) *Attorney, Agent, or Firm* — Patterson & Sheridan, LLP

(57) ABSTRACT

One embodiment of a system for collecting performance data for a multithreaded processing unit includes a plurality of independent performance registers, each configured to count hardware-based and/or software-based events. Functional blocks within the multithreaded processing unit are configured to generate various event signals, and subsets of the events are selected and used to generate one or more functions, each of which increments one of the performance registers. By accessing the contents of the performance registers, a user may observe and characterize the behavior of the different functional blocks within the multithreaded processing unit when one or more threads are executed within the processing unit. The contents of the performance registers may also be used to modify the behavior of the program running on the multithreaded processing unit, to modify a global performance register or to trigger an interrupt.

13 Claims, 4 Drawing Sheets

SHADER PERFORMANCE REGISTERS

BACKGROUND OF THE INVENTION

1. Field of the Invention

Embodiments of the present invention relate generally to computer graphics and more specifically to observing shader performance using registers to track event occurrences.

2. Description of the Related Art

A shader engine is a hardware unit within a graphics processing unit (GPU) responsible for the execution of shader programs. Some types of shader engines provide shading functionality that produces "shaded" pixel data. Other types of shader engines process vertex and geometry data, as opposed to pixel data. The output of these shader engines is generally written to a GPU memory. As GPU designs advance and become more complex, the design of the shader engine also becomes more complex. A shader engine is commonly comprised of two or more individual shader units configured to function in parallel, thereby increasing the throughput of data processed by the shader engine. Furthermore, each shader unit may allow the execution of multiple instances of a shader program (also known as threads) to increase the parallel processing capability of the shader engine. This complex and parallel shader architecture enables relatively large amounts of data to be efficiently processed.

Typical shader unit architectures may include functional blocks (also referred to herein as "functional units") such as a program controller, instruction cache, address generator and one or more execution pipes. Each functional block may, in turn, have many complex processing stages as well. In operation, the various instructions making up the different threads executing within the shader unit are fetched one-by-one by the program controller. These instructions are decoded, and then the data associated with each of the threads are processed in the execution pipes in accordance with the decoded instructions.

One drawback to this type of shader architecture is that performance optimization of a given shader unit design or a shader program is difficult. First, as previously mentioned, the shader unit contains many functional blocks, each of which may be configured in multiple ways. For example, there may be several ways to configuration a given functional block that provide substantially the same functionality; however, each configuration may have a different data throughput rate. Since there are so many different configurations for the overall shader unit, determining the optimal configuration for the unit (e.g., the configuration that provides the highest pixel throughput) is quite difficult and requires a shader designer to characterize and compare the performance of the many different shader unit configurations during the design process. Second, although the pixel throughput of a given shader unit configuration can be measured, there is no straight-forward way to observe what happens within the different functional blocks of a shader unit when one or more threads are executed within the shader unit. This task is made more difficult by the fact that each thread that is executed within the shader unit may represent different shader programs or even different types of shader programs. Thus, acquiring the information necessary to evaluate the performance of any particular shader unit or shader program configuration is also quite difficult.

As the foregoing illustrates, what is needed in the art is an improved means for observing performance within a shader unit to facilitate shader unit and shader program design.

SUMMARY OF THE INVENTION

One embodiment of the invention sets forth a system for observing event occurrences within a processing unit. The system includes a functional unit configured to generate a plurality of event signals, and a function generator configured to receive a first event signal, where the first event signal is one of the plurality of event signals generated by the functional unit, and to produce an event function based on the first event signal. The system also includes a performance register coupled to the function generator and configured to increment each time the function generator produces the event function.

One advantage of the disclosed system is that by accessing the contents of the performance register, a designer may observe and characterize the behavior of the functional unit when one or more threads are executed within the processing unit. The disclosed system may be implemented in multi-threaded processing units, such as shader units, to facilitate overall shader unit and shader program design.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

One embodiment of the present invention employs a plurality of performance registers to count event signals occurring within functional units of a shader unit. The event signals are associated with events of interest within a given functional unit. Examples of some events of interest within a program controller functional unit are instruction fetches, conditional branch instructions, call-return instructions, and the like. There may be a relatively large number of events within any one functional unit, and, as previously described herein, there may be several-functional units within a shader unit. As described in greater detail below, a function generator is used to generate a function based on one or more events. Each such function, when generated, causes one of the performance registers to increment. Thus, by accessing the contents of the performance registers, a user may observe and characterize the behavior of the different functional units within the shader unit when one or more threads are executed within the shader unit.

Figure 1:
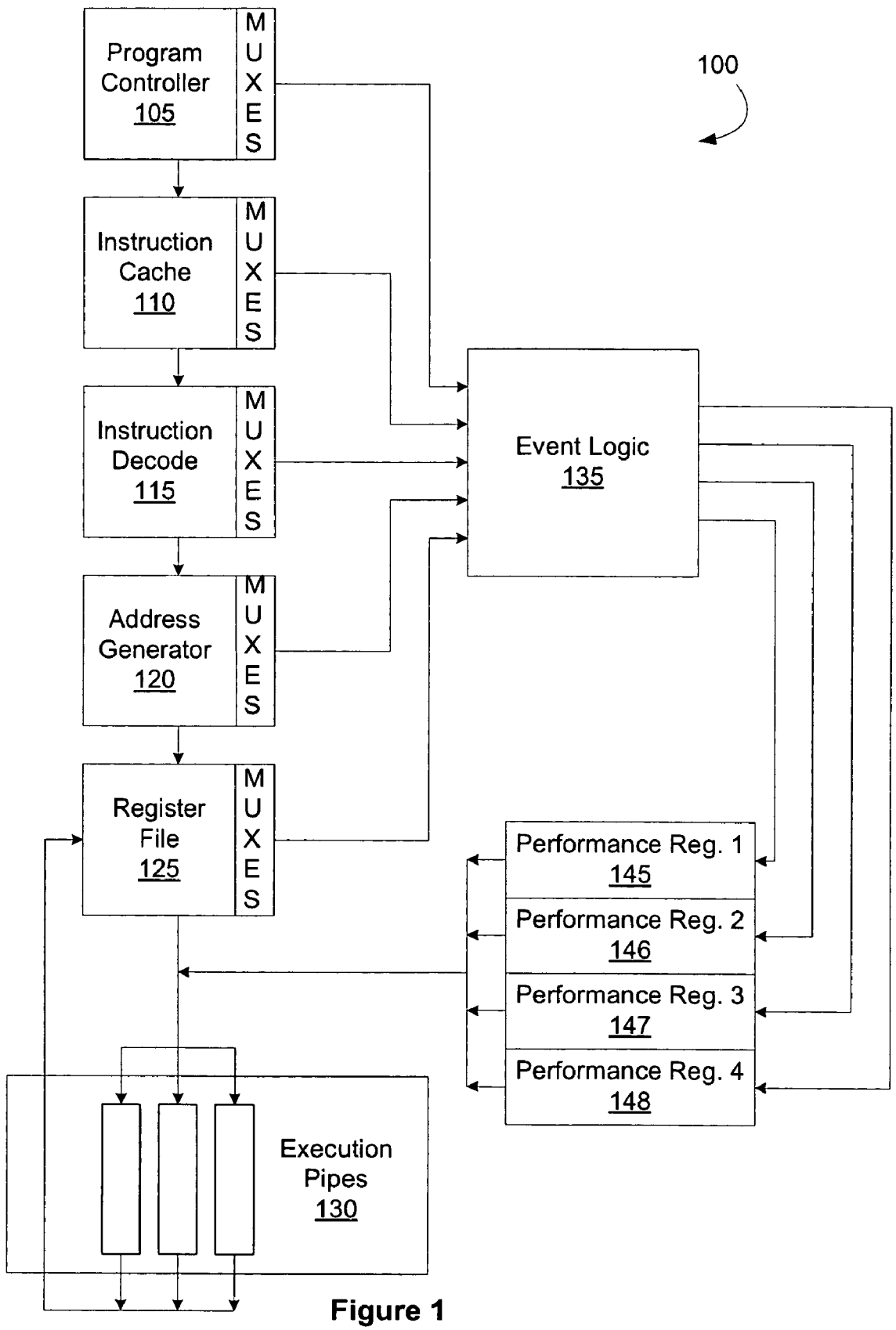
FIG. 1 is a conceptual diagram of a shader unit, according to one embodiment of the invention.

FIG. 1 is a conceptual diagram of a shader unit 100, according to one embodiment of the invention. As previously described herein, a shader engine is commonly comprised of two or more individual shader units, similar to the shader unit 100, configured to function in parallel to increase the throughput of data. As shown, the shader unit 100 includes, without limitation, a program controller 105, an instruction cache 110, an instruction decoder 115, an address generator 120, a register file 125, execution pipes 130, an event logic block 135 and four performance registers 145, 146, 147 and 148. Other embodiments may include more or less than four performance registers.

The program controller 105, instruction cache 110, instruction decoder 115, address generator 120, register file 125 and execution pipes 130 are exemplary functional units within the shader unit 100. Other embodiments of the shader unit 100 may include more or less than six functional units and may include other types of functional units in addition to or in lieu of the six functional units described herein. The functional units enable the shader unit 100 to provide shader functionality by decoding shader program instructions in the program controller 105, the instruction cache 110 and the instruction decoder 115, and processing data corresponding to the threads executing within the shader unit 100 using the address generator 120, the register file 125 and execution pipes 130.

Since the functional units provide shader functionality, the shader designer may optimize the overall design of the shader unit 100 by monitoring and evaluating process steps within one or more functional units within the shader unit 100 and using this information to implement appropriate design changes to the shader unit 100. Each functional unit may have one or more process steps that the shader designer may want to monitor and evaluate. These process steps are referred to herein as "events," and each such event has an associated "event signal."

Within a given functional unit, there may be a relatively large number of events that can be monitored and evaluated. As described in greater detail herein, one embodiment of the present invention allows up to four such events within a specific functional unit to be monitored and evaluated. As shown in FIG. 1, each functional unit 105, 110, 115, 120 and 125 has a corresponding multiplexer (mux) that is configured to select the event signals associated with the events within the functional unit that the shader designer wants to monitor and evaluate. The event signals from each functional unit 105, 110, 115, 120 and 125 are transmitted to the event logic block 135.

The event logic block 135 enables the shader designer to have greater level of control over the event signals and actual information being collected by the performance registers 145, 146, 147 and 148. For example, assume that the program controller 105 produces a conditional branch event signal, and the instruction cache 110 produces a cache miss event signal. Further assume that the shader designer is interested in situations where a conditional branch event occurs coincident with a cache miss event. Instead of configuring the first performance register 145 to count the occurrence of a first event signal (i.e., the conditional branch event signal) and the second performance register 146 to count the occurrence of a second event signal (i.e., the cache miss event signal), and then trying to examine and correlate the contents of both the first and second performance registers, the shader designer may configure the event logic block 135 using a software driver to perform a logical "and" of the first and second event signals. This logical "and" is defined as a "function," which then can be used to "trigger" a first performance register, meaning that the first performance register counts the occurrence of the function representing the logical and of the first and second event signals. In this manner, the event logic block 135 advantageously reduces the number of performance registers required to monitor two or more event signals and makes tracking complicated function more feasible. Referring again to the above example, if the first performance register counts the occurrence of the conditional branch event signal, and the second performance register counts the occurrence of the cache miss event signal, there may not be a straight-forward way to determine how many times these two event signals are coincident with one another since the performance registers also may count separate occurrences of these event signals. The ability to generate defined functions solves this problem. The structure of the even logic block 135 is described in greater detail below in conjunction with FIG. 3.

The performance registers 145, 146, 147 and 148 may be configured to count event signals occurring within one or more of the functional units. Each time an event signal occurs, the performance register is incremented. The shader designer examines the contents of the performance registers in order to better understand the processes within the different functional units 105, 110, 115, 10 and 125. In one embodiment, the contents of performance registers may be read directly a software driver. The software driver may also be configured to write a one or more of the performance registers to a specific value. In alternative embodiments, the shader unit 100 may be configured such that the contents of the performance registers affect the data within one or more of the execution pipes 130. For example, the execution pipes 130 may be configured to modify the red component of pixel data when the contents of one or more of the performance registers is greater than a predetermined threshold. In this manner, the shader designer can easily determine that the contents of the selected performance register(s) has reached or exceeded the threshold by simply monitoring the processed pixel data on a display device. In another embodiment, the contents of one or more of the performance registers may be read by programs executing within the shader unit 100, allowing the behavior of the programs to be modified by the contents of the performance registers. In yet another alternative embodiment, each performance register may be configured to have a carry out bit. The carry out bit may be monitored by another performance register, such as a performance register that is hierarchically positioned above the shader unit 100.

Each of the functional units 105, 110, 115, 120 and 125 includes a substantially similar internal structure for selecting and transmitting specified events to the event logic block 135. Therefore, only the internal structure of the program controller 105 is described in detail herein.

Figure 2:
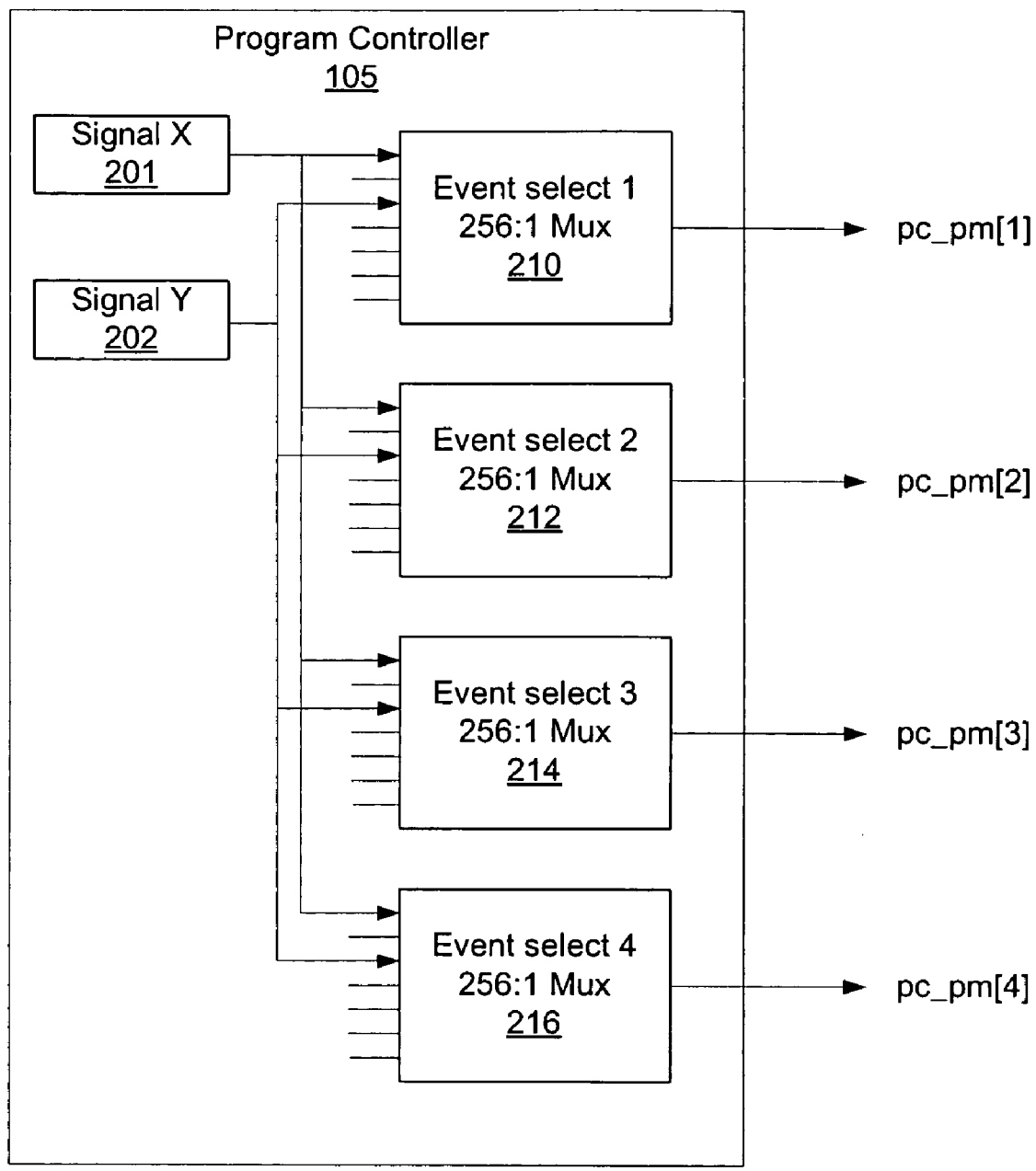
FIG. 2 is a conceptual diagram of the program controller of FIG. 1, according to one embodiment of the invention.

FIG. 2 is a conceptual diagram of the program controller 105 of FIG. 1, according to one embodiment of the invention. As shown, the program controller 105 includes, without limitation, four event multiplexers (muxes) 210, 212, 214 and 216. As previously described herein, an event may be any action of interest that occurs within a functional unit. Any one functional block may have several such events. Typical events within the program controller 105 include instruction fetches, conditional branches, call-return subroutines, and the like. Again, a given functional unit may include a relatively large number of events, and associated with each such event is an event signal. Two event signals generated within the program controller 105 are generically shown as a signal X 201 and a signal Y 202. A subset of the event signals generated within the program controller 105 may be selected through the event muxes 210, 212, 214 and 216, where each such mux is configured to select one event signal. The driver configures the event muxes 210, 212, 214 and 216 to select the event signals of interest. Thus, in this embodiment, a subset of four event signals is selected, and each selected event signal is transmitted to the event logic block 135. These event signals are denoted as pc_pm[1], pc_pm[2], pc_pm[3] and pc_pm[4]. Alternative embodiments of the program controller 105 and the other functional units described herein may include more or less than four event multiplexers.

Figure 3:
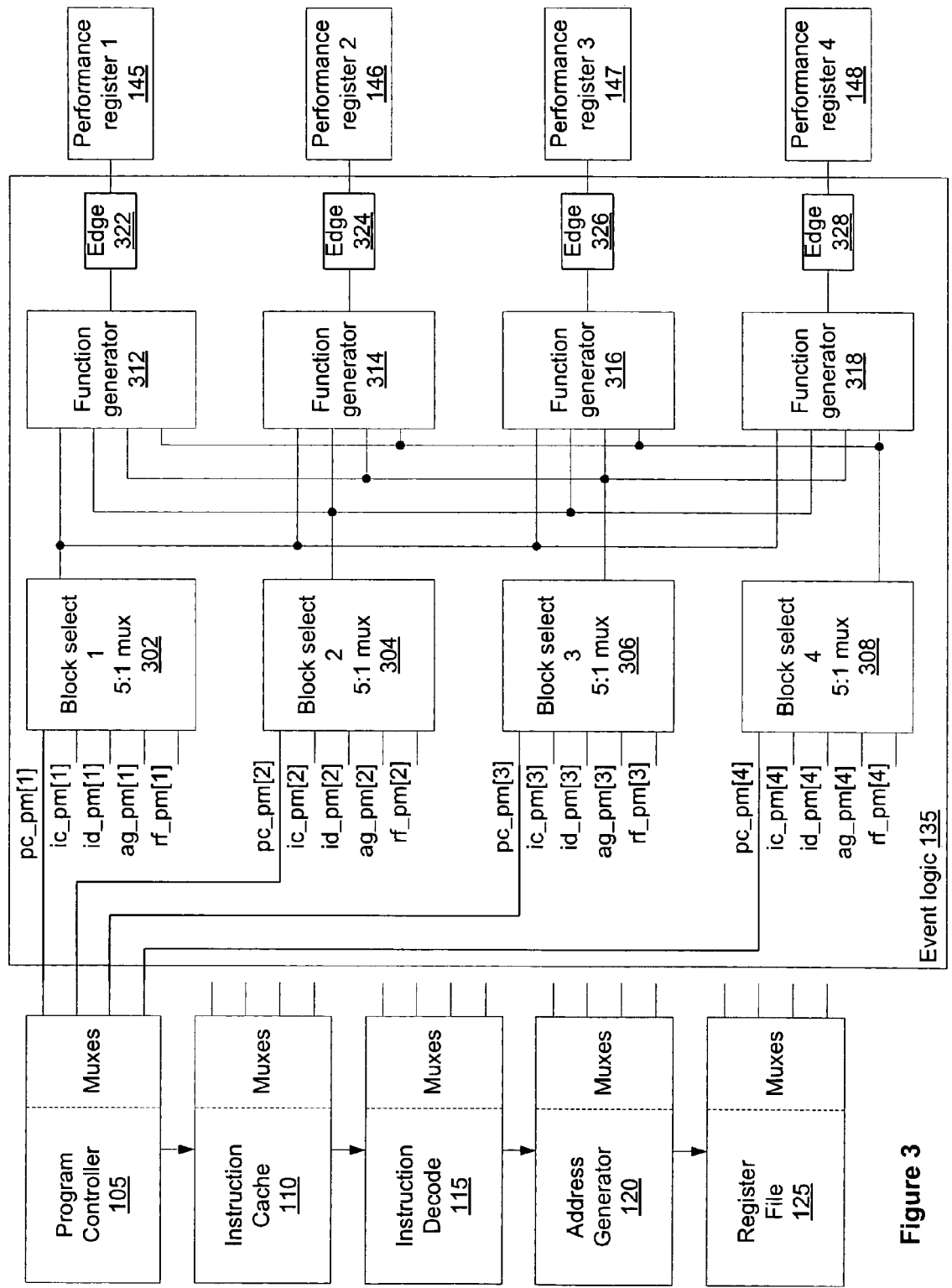
FIG. 3 is a more detailed illustration of the shader unit of FIG. 1, according to one embodiment of the invention.

FIG. 3 is a more detailed illustration of the shader unit 100 of FIG. 1, according to one embodiment of the invention. In this diagram, the functional units 105, 110, 115, 120 and 125 and the performance registers 145, 146, 147 and 148 are depicted in much the same manner as they were depicted in FIG. 1; however, the event signals selected and transmitted to the event logic block 135 are set forth in greater detail. Further, the execution pipes 130 have been omitted for clarity. The event logic block 135 includes, without limitation, a first block select mux 302, a second block select mux 304, a third block select mux 306, a fourth block select mux 308, a first function generator 312, a second function generator 314, a third function generator 316, a fourth function generator 318, a first edge selector 322, a second edge selector 324, a third edge selector 326 and a fourth edge selector 328. Alternative embodiments may include more or less than four function generators and four edge selectors.

As previously described herein, event signals selected by the muxes within the functional units 105, 110, 115, 120 and 125 are transmitted to the event logic block 135. As described in FIG. 2, in one embodiment, four selected event signals from each functional unit are transmitted to the event logic block 135. Thus, as shown in FIG. 3, each of the block select muxes 302, 304, 306 and 308 is configured to receive one event signal from each of the program controller 105, the instruction cache 110, the instruction decoder 115, the address generator 120 and the register file 125. Each block select mux, therefore, receives five event signals. For example, pc_pm[1] is transmitted from the program controller 105 to the first block select mux 302. Similarly, pc_pm[2] is transmitted from the program controller 105 to the second block select mux 304, pc_pm[3] is transmitted from the program controller 105 to the third block select mux 306 and pc_pm[4] is transmitted from the program controller 105 to the fourth block select mux 308. The other functional units 110, 115, 120 and 125 are similarly configured to transmit a different selected event signal to each of the block select muxes 302, 304, 306 and 308. The individual signal paths have been omitted from the figure for clarity, but the signal names are noted on the appropriate block select muxes 302, 304, 306 and 308, as the case may be. For example, ic_pm[1] is the first selected event signal from the instruction cache 110 and is shown as the second input to the first block select mux 302, and ag_pm[3] is the third selected event signal from the address generator 120 and is shown as the fourth input to the third block select mux 306.

Each of the block select muxes 302, 304, 306 and 308 is a five-to-one event signal mux that is configured by the driver to select one of the five event signals received from the functional units 105, 110, 115, 120 and 125 and to transmit the selected event signal to the function generators 312, 314, 316 and 318. As shown in FIG. 3, in one embodiment, the output of each block select mux 302, 304, 306 and 308 is transmitted to each of the function generators 312, 314, 316 and 318.

Each function generator 312, 314, 316 and 318 is configured by the driver to generate an "event function" based upon the four event signals received from the block select muxes 302, 304, 306 and 308. Each event function is a combination of one or more of those four event signals. In one embodiment, the function generator comprises a lookup table with sixteen entries, where each entry is a unique combination of the event signal states. Persons skilled in the art will recognize that such a lookup table may generate any event function representing any combination of the four event signals received by a particular function generator.

An edge selector is coupled to each function generator and is configured to receive the event function transmitted by the function generator. As shown, the first function generator 312 is coupled to the first edge selector 322, the second function generator 314 is coupled to the second edge selector 324, the third function generator 316 is coupled to the third edge selector 326 and the fourth function generator 318 is coupled to the fourth edge selector 328. A performance register is coupled to each edge selector and is configured to receive an edge signal transmitted by the edge selector. As shown, the first performance register 145 is coupled to the first edge selector 322, the second performance register 146 is coupled to the second edge selector 324, the third performance register 147 is coupled to the third edge selector 326 and the fourth performance register 148 is coupled to the fourth edge selector 328.

Upon receiving an event function from a function generator, the edge selector may be configured to pass the event function directly to the performance register or the edge selector may be configured to pass a logical true when the event function transitions and pass a logical false when the event function does not transition. In an alternative embodiment, the edge selector may determine the polarity of the edge of the event function that causes the performance register coupled to that edge selector to count. In other words, the edge selector selects either the rising or falling edge of the event function to trigger the performance register coupled to that edge selector. For example, the edge selector 322 may be configured to pass the event function received from the function generator 312 to trigger the first performance register 145, and the edge selector 324 may be configured to pass a logical true to trigger the second performance register 146 when the event function received from the function generator 314 transitions. Thus, the signals from the edge selectors 322, 324, 326 and 328 are used to trigger the performance registers 145, 146, 147 and 148, respectively, to count the occurrences of the event functions generated by the function generators 312, 314, 316 and 318, respectively.

In sum, the shader designer decides which events within the functional units 105, 110, 115, 120 and 125 to monitor and evaluate. Based on this information, the shader designer determines what event functions should be tracked. The function generators 312, 314, 316 and 318 are configured to generate the event functions the shader designer wants to track. The event muxes within the functional units 105, 110, 115, 120 and 125 and the block select muxes 302, 304, 306 and 308 are then configured to transmit the appropriate event signals to the to function generators 312, 314, 316 and 318, as the case may be, to generate the desired event functions.

In operation, the performance registers 145, 146, 147 and 148 coupled to the function generators 312, 314, 316 and 318, respectively, count the occurrences of the event functions the shader designer wants to track. Again, by examining the contents of the performance registers 145, 146, 147 and 148, the shader designer may gain insight into the processes that occur throughout the shader unit 100. This information may be useful in increasing the data throughput of the shader unit 100, or may also be helpful in developing and debugging shader programs in general.

Figure 4:
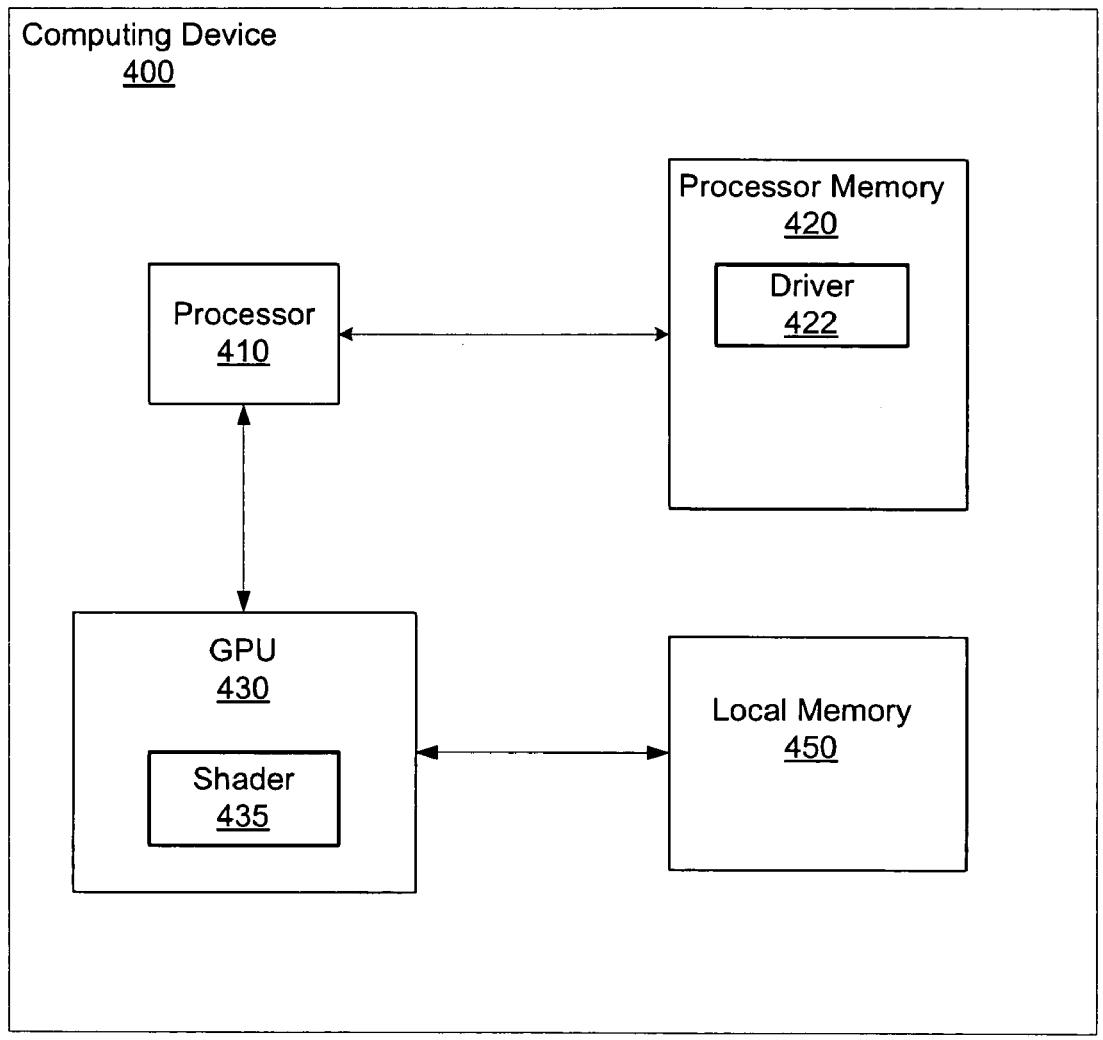
FIG. 4 is a conceptual diagram of a computing device in which one or more aspects of the aspects of the present invention may be implemented.

FIG. 4 is a conceptual diagram of a computing device 400 in which one or more aspects of the aspects of the present invention may be implemented. The computing device 400 includes, without limitation, a processor 410, processor memory 420, a graphics processing unit (GPU) 430 and local memory 450 for the GPU 430. The computing device 400 may be a desktop computer, server, laptop computer, palm-sized computer, personal digital assistant, tablet computer, game console, cellular telephone, or any other type of similar device that processes data. The processor 410 is coupled to the processor memory 420 used to store data and programs executed by the processor, such as a driver 422. The processor 410 is also coupled to the GPU 430. The GPU 430 includes at least one shader unit 435. Within the shader unit 435 are the functional units, the execution pipes, the event logic block and the performance registers, not shown, but described above in conjunction with FIGS. 1-3. The driver 422 may configure the GPU 430, and specifically the shader unit 435, by selecting events using the muxes in the functional units, by configuring the event logic block and execution pipes and by monitoring the data in the performance registers, as previously described herein. The processor 410 may also store instructions for the shader unit 435 in the local memory 450.

While the foregoing is directed to embodiments of the present invention, other and further embodiments of the invention may be devised without departing from the basic scope thereof. For example, although the present invention has been described in the context of shader units within a graphics processing unit, persons skilled in the art will appreciate that aspects of the present invention may be implemented in general purpose processing units as well. Thus, the scope of the invention is determined by the claims that follow.

We claim:

1. A system for observing event occurrences within a processing unit, the system comprising:
    a first functional unit configured to generate a first plurality of event signals and including a first event multiplexer and a second event multiplexer, wherein the first event multiplexer is configured to select a first event signal from the first plurality of event signals, and the second event multiplexer is configured to select a second event signal from the first plurality of event signals;
    a second functional unit configured to generate a second plurality of event signals and including a third event multiplexer and a fourth event multiplexer, wherein the third event multiplexer is configured to select a third event signal from the second plurality of event signals, and the fourth event multiplexer is configured to select a fourth event signal from the second plurality of event signals;
    a first block select multiplexer configured to receive the first event signal from the first event multiplexer and the third event signal from the third event multiplexer;
    a second block select multiplexer configured to receive the second event signal from the first event multiplexer and the fourth event signal from the fourth event multiplexer;
    a function generator configured to produce an event function, wherein the first block select multiplexer selects and transmits either the first event signal or the third event signal to the function generator, and the second block select multiplexer selects and transmits either the second event signal or the fourth event signal to the function generator, and wherein the event function produced by the function generator is based on the event signals selected by the first and second block select multiplexers; and
    a performance register coupled to the function generator and configured to increment each time the function generator produces the event function, wherein a behavior of a program executed by the processing unit is modified based on contents of the performance register.

2. The system of claim 1, further comprising a second function generator and a second performance register coupled to the second function generator, wherein the first block select multiplexer selects and transmits either the first event signal or the third event signal to the second function generator, and the second block select multiplexer selects and transmits either the second event signal or the fourth event signal to the second function generator.

3. The system of claim 2, wherein the second function generator is configured to produce a second event function based on either the second event signal or the fourth event signal, and the second performance register is configured to increment each time the second function generator produces the second event function.

4. The system of claim 1, further comprising a second function generator and a second performance register coupled to the second function generator, wherein the second block select multiplexer selects and transmits either the second event signal or the fourth event signal to the second function generator, and the event function produced by the second function generator is based on the event signals selected by the first and second block select multiplexers.

5. The system of claim 1, further comprising an edge selector coupled to the function generator and configured either to detect an edge of the event function or to pass an unmodified event function signal to the performance register.

6. The system of claim 1, wherein the functional unit is a program controller, an instruction decoder or a register file.

7. The system of claim 1, wherein the performance register is configured to produce a carry out bit that may be monitored by a second performance register.

8. A computing device configured for observing event occurrences within a shader unit, the computing device comprising:
    a memory; and
    a graphics processing unit that includes the shader unit, wherein the shader unit comprises:
        a first functional unit configured to generate a first plurality of event signals and including a first event multiplexer and a second event multiplexer, wherein the first event multiplexer is configured to select a first event signal from the first plurality of event signals, and the second event multiplexer is configured to select a second event signal from the first plurality of event signals,
        a second functional unit configured to generate a second plurality of event signals and including a third event multiplexer and a fourth event multiplexer, wherein the third event multiplexer is configured to select a third event signal from the second plurality of event signals, and the fourth event multiplexer is configured to select a fourth event signal from the second plurality of event signals,
        a first block select multiplexer configured to receive the first event signal from the first event multiplexer and the third event signal from the third event multiplexer,
        a second block select multiplexer configured to receive the second event signal from the first event multiplexer and the fourth event signal from the fourth event multiplexer,
        a function generator configured to produce an event function, wherein the first block select multiplexer selects and transmits either the first event signal or the third event signal to the function generator, and the second block select multiplexer selects and transmits either the second event signal or the fourth event signal to the function generator, and wherein the event function produced by the function generator is based on the event signals selected by the first and second block select multiplexers, and
        a performance register coupled to the function generator and configured to increment each time the function generator produces the event function, wherein a behavior of a program executed by the graphics processing unit is modified based on contents of the performance register.

9. The computing device of claim 8, further comprising a second function generator and a second performance register coupled to the second function generator, wherein the first block select multiplexer selects and transmits either the first event signal or the third event signal to the second function generator, and the second block select multiplexer selects and transmits either the second event signal or the fourth event signal to the second function generator.

10. The computing device of claim 9, wherein the second function generator is configured to produce a second event function based on either the second event signal or the fourth event signal, and the second performance register is configured to increment each time the second function generator produces the second event function.

11. The computing device of claim 8, further comprising a second function generator and a second performance register coupled to the second function generator, wherein the second block select multiplexer selects and transmits either the second event signal or the fourth event signal to the second function generator, and the event function produced by the second function generator is based on the event signals selected by the first and second block select multiplexers.

12. The computing device of claim 8, further comprising a shader program that resides in the memory and includes instructions for reading the count of the performance register.

13. A method for observing event occurrences within a processing unit, the method comprising:
generating a first plurality of event signals within a first functional unit that includes a first event multiplexer configured to select a first event signal and a second event multiplexer configured to select a second event signal, wherein the first and second event signals are from the plurality of event signals;
generating a second plurality of event signals within a second functional unit that includes a third event multiplexer configured to select a third event signal and a fourth event multiplexer configured to select a fourth event signal, wherein the third and fourth event signals are from the second plurality of event signals;
generating an event function based on (i) selecting either the first event signal or the third event signal, and (ii) selecting either the second event signal or the fourth event signal; and
causing a performance register to increment each time the event function is generated, wherein a behavior of a program executed by the processing unit is modified based on contents of the performance register.

\* \* \* \* \*